(12) United States Patent
Sawada et al.

(10) Patent No.: US 11,492,121 B2
(45) Date of Patent: Nov. 8, 2022

(54) AIRCRAFT PROJECTION DEVICE

(71) Applicant: Koito Manufacturing Co., Ltd., Tokyo (JP)

(72) Inventors: Shigeo Sawada, Shizuoka (JP); Akio Shoji, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 378 days.

(21) Appl. No.: 16/738,104

(22) Filed: Jan. 9, 2020

(65) Prior Publication Data

US 2020/0231284 A1    Jul. 23, 2020

(30) Foreign Application Priority Data

Jan. 18, 2019   (JP) .............................. JP2019-007149

(51) Int. Cl.
| | |
|---|---|
| *B64D 11/06* | (2006.01) |
| *G03B 21/12* | (2006.01) |
| *G08B 5/00* | (2006.01) |
| *B64D 45/00* | (2006.01) |
| *G09F 19/18* | (2006.01) |
| *G09F 19/22* | (2006.01) |
| *G08B 5/22* | (2006.01) |
| *B60Q 3/51* | (2017.01) |
| *B64D 11/00* | (2006.01) |

(52) U.S. Cl.
CPC ................ *B64D 11/06* (2013.01); *B60Q 3/51* (2017.02); *B64D 45/00* (2013.01); *G03B 21/12* (2013.01); *G08B 5/00* (2013.01); *G08B 5/221* (2013.01); *G09F 19/18* (2013.01);

*G09F 19/228* (2013.01); *B64D 11/0015* (2013.01); *B64D 2045/007* (2013.01)

(58) Field of Classification Search
None
See application file for complete search history.

(56) References Cited

U.S. PATENT DOCUMENTS

| | | | | |
|---|---|---|---|---|
| 6,964,481 | B2 * | 11/2005 | Pho ................... | B64D 11/00151 353/42 |
| 10,303,414 | B2 * | 5/2019 | Watanabe ............ | H04N 9/3155 |
| 11,040,781 | B2 * | 6/2021 | Akkerman ........... | G08B 21/182 |
| 2005/0110952 | A1 * | 5/2005 | Pho ................... | B64D 11/00151 353/28 |
| 2014/0253335 | A1 * | 9/2014 | Curtis ................. | B64D 11/00 340/573.1 |

(Continued)

FOREIGN PATENT DOCUMENTS

| | | | | |
|---|---|---|---|---|
| CA | 3060269 A1 * | 4/2020 | ............. | B64D 11/00 |
| DE | 102008008153 A1 * | 8/2009 | ............. | G09F 19/22 |

(Continued)

OTHER PUBLICATIONS

An English translation of the Written Opinion for a French counterpart (FR200393) of this application, dated Oct. 21, 2020 (3 pages).

*Primary Examiner* — Fekadeselassie Girma
(74) *Attorney, Agent, or Firm* — Venjuris, P.C.

(57) ABSTRACT

An aircraft projection device includes a projector that displays an image by projecting the image onto a floor surface of a passage in an interior of an aircraft; and a controller that controls the projector to display the image onto the floor surface of the passage in the interior of the aircraft.

12 Claims, 5 Drawing Sheets

(56) References Cited

U.S. PATENT DOCUMENTS

| | | | | |
|---|---|---|---|---|
| 2015/0239573 A1* | 8/2015 | Jouper | .................. | B64D 11/06 |
| | | | | 701/3 |
| 2017/0289494 A1* | 10/2017 | Garing | ................ | H04N 9/3141 |
| 2018/0281673 A1 | 10/2018 | Garing et al. | | |
| 2019/0031366 A1* | 1/2019 | Lauer | ...................... | H04W 4/80 |
| 2022/0204176 A1* | 6/2022 | Clarke | ............. | H01M 8/04298 |
| 2022/0206122 A1* | 6/2022 | Humphrey | ............ | G01S 7/4817 |

FOREIGN PATENT DOCUMENTS

| | | |
|---|---|---|
| DE | 102008008153 A1 | 8/2009 |
| JP | H06-305488 A | 11/1994 |
| WO | 2006/002852 A2 | 1/2006 |

\* cited by examiner

AIRCRAFT PROJECTION DEVICE

CROSS-REFERENCE TO RELATED APPLICATIONS

This application is based on and claims priority from Japanese Patent Application No. 2019-007149, filed on Jan. 18, 2019, with the Japan Patent Office, the disclosure of which is incorporated herein in its entirety by reference.

TECHNICAL FIELD

The present disclosure relates to an aircraft projection device that displays an image by projecting the image in an interior of an aircraft.

BACKGROUND

In addition to the exterior lights such as anti-collision lights or aviation lights, an aircraft includes interior lights such as reading lights or cabin lighting used as lighting of the interior of the aircraft.

Meanwhile, some aircrafts are provided with an aircraft projection device that is used in the interior and displays an image by projecting the image (see, e.g., Japanese Patent Laid-Open Publication No. 06-305488). An example of an aircraft projection device including a video projector that projects an image (video) on a screen in the cabin is disclosed in Japanese Patent Laid-Open Publication No. 06-305488.

SUMMARY

However, while many passengers board an aircraft, the number of crew members such as cabin attendants is limited. Therefore, it may be difficult to provide satisfactory services to all passengers. Further, in an aircraft that flies at night, the interior is set to a night lighting mode and many passengers are sleeping in the situation where the night lighting mode is set. Therefore, it may be difficult for a passenger to speak out to call a crew member, or to recognize the position of his/her seat when the passenger comes back from a toilet, and thus, the passenger may feel inconvenience.

Therefore, an aircraft projection device of the present disclosure is to promote improvement on convenience for passengers.

The aircraft projection device according to the present disclosure includes a projector that displays an image by projecting the image onto a floor surface of a passage in an interior of an aircraft; and a controller that controls the projector to display the image.

Therefore, it is possible for a passenger or a crew member to recognize the intention of the passenger or an offer matter to the passenger by visually recognizing the image displayed on the floor surface of the passage.

Second, in the aircraft projection device according to the present disclosure described above, the controller may perform a projection start control by the projector according to determination on a projection start trigger based on detection information of a sensor, and perform a projection end control by the projector according to determination on a projection end trigger based on the detection information of the sensor.

Therefore, the projection start control and the projection end control are performed based on the detection information of the sensor.

Third, in the aircraft projection device according to the present disclosure described above, the sensor may include a seating sensor configured to detect whether a passenger is seated on a seat, and the controller may perform the determination on the projection start trigger or the projection end trigger based on the detection information of the seating sensor.

Therefore, the projection start or the projection end for the image is performed based on the information whether or not the passenger is seated, as detected by the seating sensor.

Fourth, in the aircraft projection device according to the present disclosure described above, the sensor may include an illuminance sensor configured to detect illuminance of the interior of the aircraft, and the controller may perform the determination on the projection start trigger or the projection end trigger based on the detection information of the illuminance sensor.

Therefore, the projection start or the projection end for the image is performed based on the information on the illuminance of the interior detected by the illuminance sensor.

Fifth, in the aircraft projection device according to the present disclosure described above, the projector may display a seat number as an image.

Therefore, the passenger recognizes the position of his/her seat as the destination by visually recognizing the image.

Sixth, in the aircraft projection device according to the present disclosure described above, the projector may be disposed inside the seat, and the seat may have a projection hole through which projection light from the projector passes.

Therefore, a dedicated member for arranging the projector is not necessary, and the projector does not hinder passengers who are seated on or away from the seat, or the passage of passengers or crew members who walk on the passage.

Seventh, in the aircraft projection device according to the present disclosure described above, the projection hole may be positioned below the seat surface of the seat.

Therefore, the passenger and the crew member do not feel dazzle by the projected light.

According to the present disclosure, it is possible for the passenger or the crew member to recognize the intention of the passenger or an offer matter to the passenger by visually recognizing the image displayed on the floor surface of the passage, and thus the improvement on convenience for the passenger may be promoted.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Hereinafter, embodiment will be described with reference to the drawings. In the embodiment, descriptions will be made on an example in which an aircraft projection device 1 is disposed inside a seat in an aircraft cabin.

Figure 1:
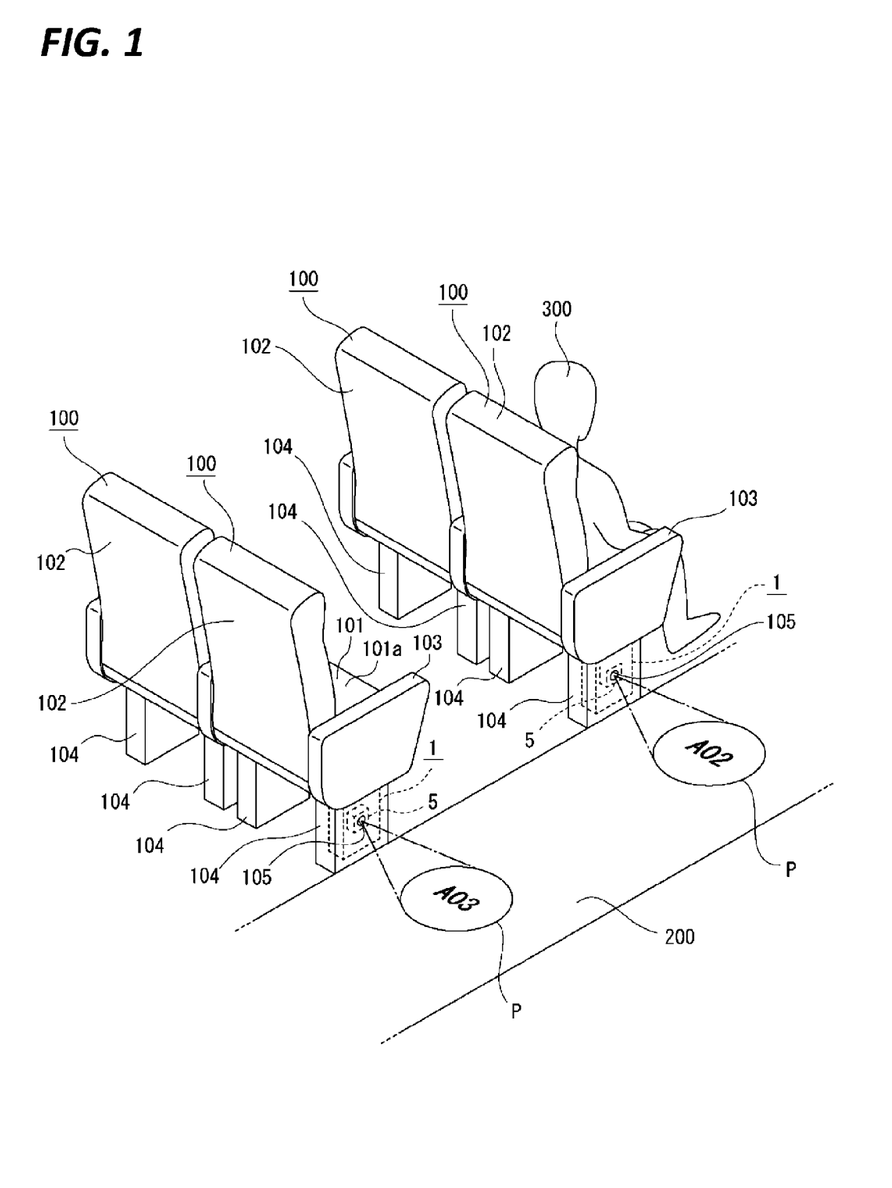
FIG. 1 illustrates an embodiment of an aircraft projection device of the present disclosure together with FIGS. 2 to 5, and is a perspective view illustrating a state where an image is displayed on a passage.

A plurality of seats 100 is disposed in the cabin in the aircraft, and a passage 200 is provided along the row of the seats 100 (see FIG. 1).

A seat 100 includes a seat portion 101 on which a passenger 300 is seated, a back seat portion 102 capable of changing an inclination angle with respect to the seat portion 101, armrest portions 103 and 103 projected upward from both left and right sides of the seat portion 101, and leg portions 104 and 104 supporting the seat portion 101, the back seat portion 102, and the armrest portions 103 and 103. An upper surface of the seat portion 101 is formed as a seat surface 101a. The leg portions 104 and 104 are projected downward from the both left and right sides of the seat portion 101, and lower end portions are fixed to the floor surface.

A projection hole 105 is formed on the seat 100 along the passage 200, for example, a leg portion 104 on the passage 200 side, and the aircraft projection device 1 is disposed inside the leg portion 104 in which the projection hole 105 is formed. Therefore, the projection hole 105 is positioned below the seat surface 101a.

The aircraft projection device 1 performs projection of an image P on the floor surface of the passage 200, that is, in the vicinity of the seat 100, so that the image P is displayed. As the image P, for example, seat numbers such as "A02" or "A03" are displayed.

The aircraft projection device 1 is disposed inside each seat 100 along the passage 200, respectively, and the projection light passes through each projection hole 105 to perform the projection of the image P. The image P is displayed on the floor surface immediately next to each seat 100, and thus, the passenger 300 or the crew member recognizes which seat 100 each image P is related to.

In the above, although the example in which the image P and the seat 100 are corresponded to each other by displaying the image P on the floor surface immediately next to the seat 100, the position on which the image P is displayed is arbitrary as long as it is the passage 200, may be a diagonally front side or a diagonally rear side of the seat 100, and may be a position where the passenger walking on the passage 200 or the passenger standing up and leaving the seat 100 can recognize the corresponding seat 100.

Figure 2:
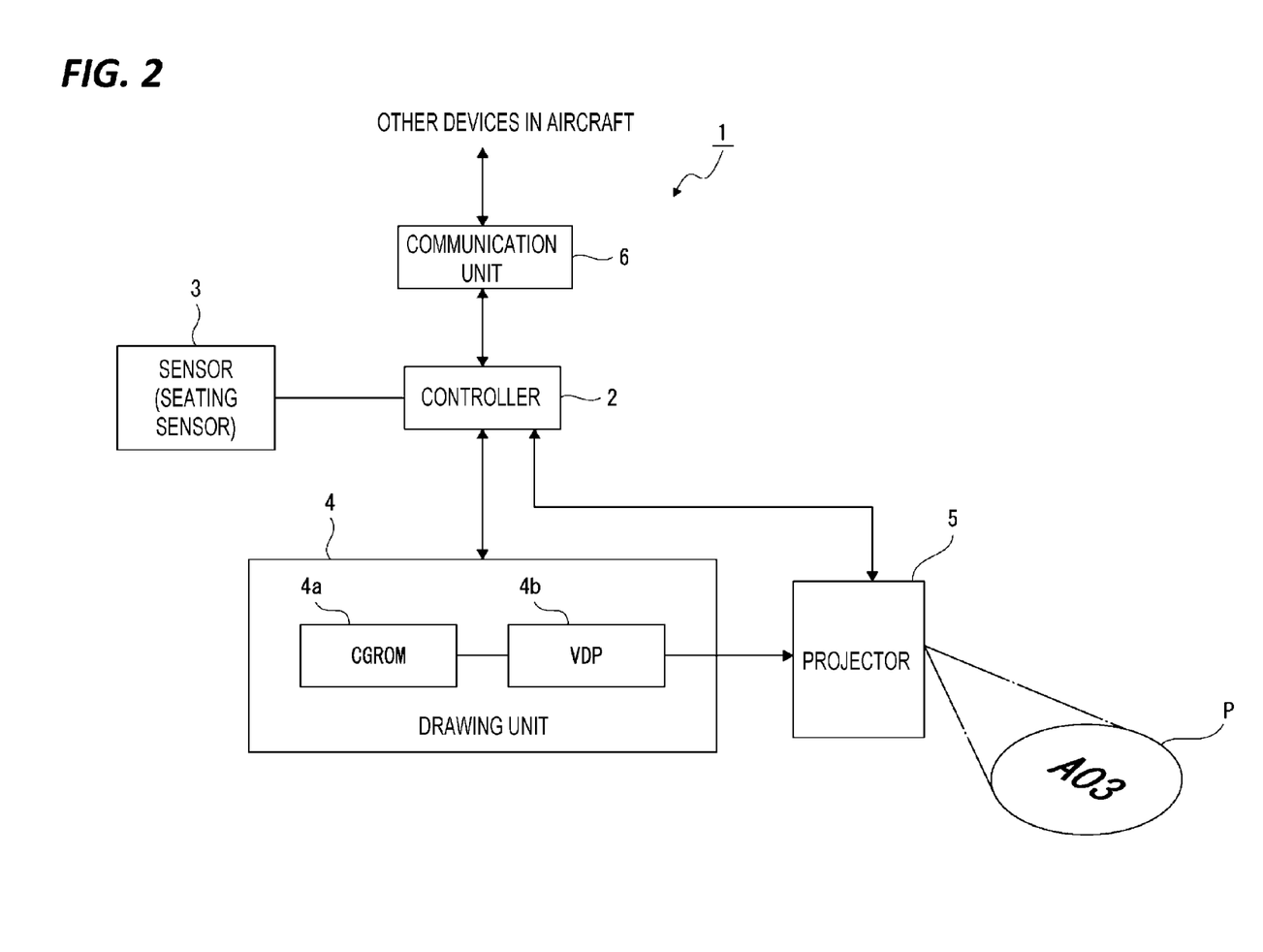
FIG. 2 is a block diagram of the aircraft projection device.

Hereinafter, an exemplary configuration of the aircraft projection device 1 will be described (see FIG. 2).

The aircraft projection device 1 includes a controller 2, a sensor 3, a drawing unit 4, a projector 5, and a communication unit 6.

The controller 2 is configured by a micro computer including, for example, a central processing unit (CPU), a random access memory (RAM), a read only memory (ROM), and an electrically erasable programmable read only memory (EEPROM), and performs an operation control of the drawing unit 4 or the projector 5 based on detection information by the sensor 3.

The sensor 3 collectively represents various sensors. Examples of the sensor 3 include various detection devices such as a weight sensor, a pressure sensor, a thermal sensor, an optical sensor, a contact sensor, a sound sensor, and a magnetic sensor.

For example, by using, as the sensor 3, a seating sensor that detects whether the passenger 300 is seated on the seat 100, it is possible to detect the presence and the absence of the seating of the passenger 300 by sensing the weight, the pressure, or the body of the seated passenger on the seat portion 101 of the seat 100. Further, by using an optical sensor or a thermal sensor as the sensor 3, it is possible to detect the presence or absence of the approaching of a person with respect to the seat 100. Further, by using, as the sensor 3, an operation input device such as a switch, a keyboard, a touch panel, or a microphone that is operable by the passenger 300, it is possible to detect the operation by the passenger 300 by these operation input devices.

The drawing unit 4 performs a processing that generates contents of the drawing in the image P, and includes, for example, a character generator from (CG-ROM) 4a and a video display processor 4b (VDP).

The CG-ROM 4a stores various material images used for drawing. The VDP 4b performs the drawing of the image P using the material image read from the CG-ROM 4a, and supplies the drawing data to the projector 5. The drawing unit 4 performs the drawing of a necessary content at necessary timing in accordance with, for example, an instruction from the controller 2.

The projector 5 includes, for example, a light source, a light modulation unit, and a projection lens system, and displays the image P on the floor surface of the passage 200 by projecting the image P based on the drawing data sent from the drawing unit 4.

Examples of the light source include various light sources such as a light emitting diode (LED), a laser light source, a xenon lamp, and a mercury lamp. Examples of the light modulation unit include a liquid crystal light valve. The image P drawn by the drawing unit 4 is displayed on the passage 200 by controlling the light crystal light valve according to the drawing data, and modulating the projection light by the light modulation unit.

The communication unit 6 performs communication with an in-flight master device, an operation device, or a network having these various devices built in the aircraft. For example, the communication unit 6 receives commands from the master device or the operation device in the aircraft, and sends a projection start command or a projection end command for each aircraft projection device 1 to the controller 2.

Figure 3:
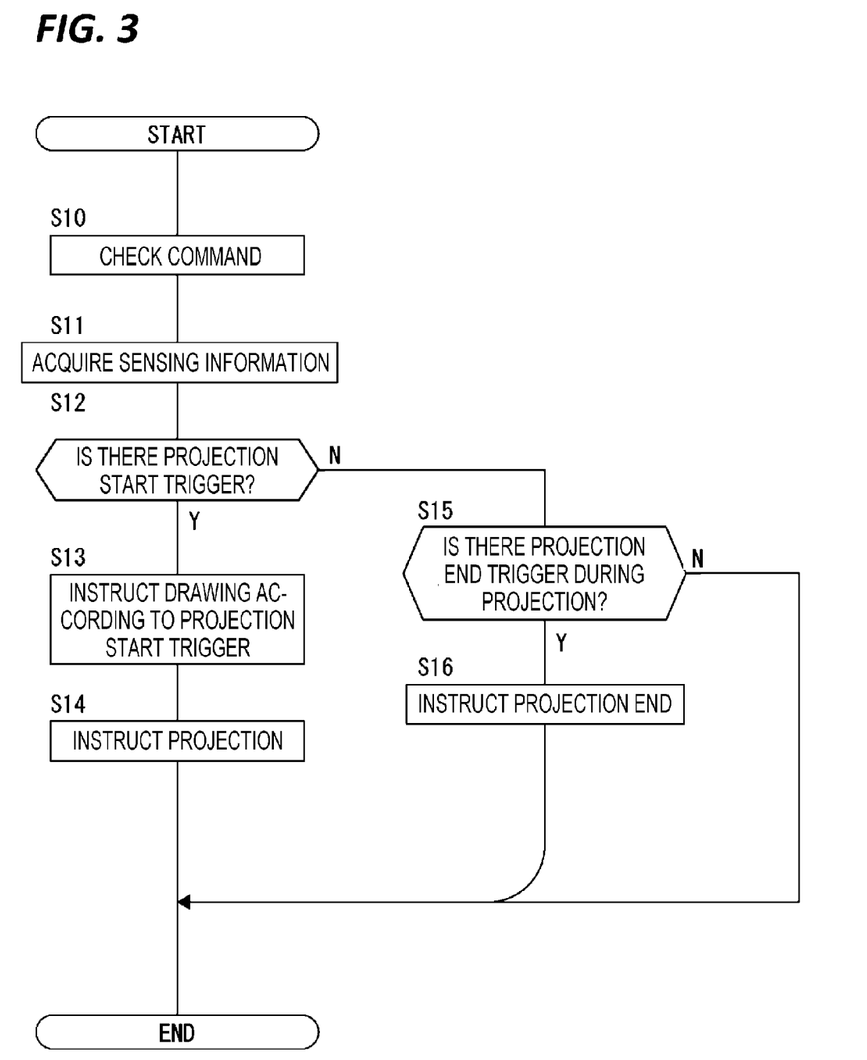
FIG. 3 is a flow chart illustrating a processing of a controller of the aircraft projection device.

In the aircraft projection device 1 configured as described above, the controller 2 performs, for example, the following controls (see FIG. 3). Further, the controller 2 performs a processing at every predetermined timing, and repeatedly performs the following processings.

In Step S10, the controller 2 confirms the reception of a command via the communication unit 6 from the master device or the operation device by a command check.

In Step S11, the controller 2 acquires the detection information by the sensor 3. For example, the controller 2 senses the presence or absence of the seating of the passenger 300 or the presence or absence of an operation by the passenger 300.

In Step S12, the controller 2 determines the presence or absence of the projection start trigger based on the command check in Step S10 or the detection information acquired in Step S11. The projection start trigger is a predetermined condition to start the display of the image P, and occurs, for example, when it is detected that the passenger 300 has left from the seat 100 in a state where the communication unit 6 has received the projection start command. The determination condition of the projection start trigger may be set according to the usage aspect of the aircraft projection device 1.

When it is determined that the projection start trigger occurs, the controller 2 controls to proceed from Step S12 to Step S13 to instruct the drawing for projection of the image P according to the determined projection start trigger. That is, the controller 2 instructs the execution of the drawing and the contents of the image P for the drawing unit 4.

In Step S14, the controller 2 instructs the projector 5 to start projection. Therefore, the projection based on the drawing date generated by the drawing unit 4 is started by the projector 5, and the set image P is displayed on the passage 200.

Meanwhile, when it is determined that the projection start trigger does not occur in Step S12, the controller 2 determines whether the projection end trigger occurs or not during projection in Step S15. The projection end trigger is a predetermined condition to end the display of the image P, and occurs, for example, when it is detected that the passenger 300 has been seated on the seat 100 in a state where the communication unit 6 has received the projection end command. The determination condition of the projection end trigger may be set corresponding to the projection start trigger.

When the projection is not performed, one processing is ended from Step S15.

During projection, in Step S15, the controller 2 determines whether the projection end trigger occurs or not based on the command check in immediately preceding Step S10 or the detection information acquired in Step S11.

When it is determined that the projection end trigger occurs during projection, the controller 2 controls to proceed from Step S15 to Step S16, and instructs the projection unit 5 to end the projection. Therefore, the projection by the projector 5 based on the drawing data generated by the drawing unit 4 is ended.

Subsequently, an example in which the projection of the image P is performed in accordance with the passenger 300 leaving the seat will be described as a specific example implemented by the control (see FIGS. 4A to 4C).

Figure 4A:
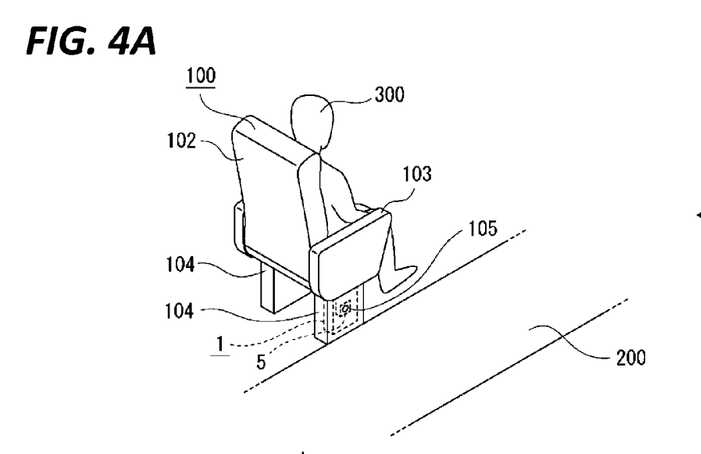
FIGS. 4A to 4C are explanation views illustrating an exemplary operation of he aircraft projection device.

The projection of the image P is not performed in a state where the passenger 300 is seated on the seat 100 (see FIG. 4A).

Figure 4B:
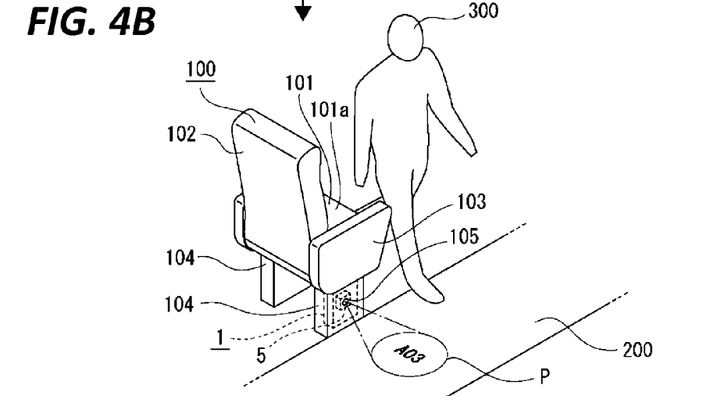

When the passenger 300 stands up to leave the seat, the controller 2 senses the state of not being seated as detection information by the sensor 3, and for example, the projection of the image P is started by considering this as the occurrence of the projection start trigger (see FIG. 4B). In this example, a seat number is displayed as the image P. The passenger 300 who has left the seat may confirm and memorize the seat number of his/her seat 100 by visually recognizing the image P.

Figure 4C:
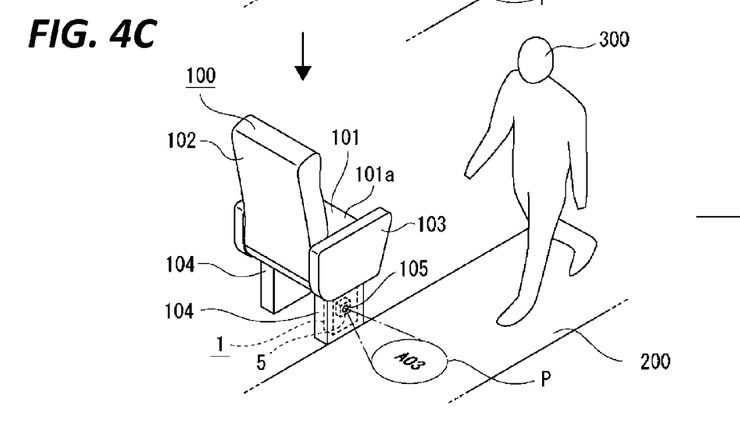

For example, when going to and returning from the toilet, the passenger 300 may confirm the seat number of his/her seat 100 by visually recognizing the image P (see FIG. 4C). At this time, since the seat number is displayed on the passage 200 in the vicinity of his/her seat 100, the passenger 300 may be seated on his/her seat 100 without hesitation.

When the passenger 300 is seated on the seat, the controller 2 senses the seating as the detection information by the sensor 3. For example, the projection of the image P is ended by considering this as the occurrence of the projection end trigger. Therefore, the display of the image P is ended (see FIG. 4A).

As described above, the image P becomes an appropriate guide for the passenger 300 returning after leaving the seat to find his/her seat 100, by projecting the image P in accordance with the presence or absence of the seating of the passenger 300 with respect to the seat 100. That is, since the image P is displayed on the passage 200 only by the aircraft projection device 1 provided in the seat 100 where a passenger has left, the display of the image P itself functions as a guide irrespectively the contents of the display of the image P. Further, when the contents of the image P display the seat number, the image P becomes a more reliable guide for the passenger 300.

In a case, for example, where there is a seat 100 that is not reserved by the passenger 300, the seat 100 may not be determined to the seat-leaving state even if the seat 100 is empty.

For example, when the seat-leaving is sensed with a condition that the seating of the passenger 300 for a certain period of time is sensed, this may be used as the projection start trigger. Further, for example, the processing in which the image P is projected may not be performed by determining a vacant seat in cooperation with an in-flight system that manages seats, and notifying in advance information on the vacant seat to the controller 2 of the aircraft projection device 1 disposed in the vacant seat.

Further, although the display of the image P is performed by the aircraft projection device 1 disposed inside the seat 100 on the passage 200 side, the aircraft includes seats 100 on the deeper side or the inner side that do not face the passage 200. In this case, only the sensor 3 may be disposed in the seat 100 that does not face the passage 200, and the controller 2 of the aircraft projection device 1 disposed inside the seat 100 on the passage 200 side may detect the detection information of the sensor 3.

For example, in a case where four seats 100 are arranged and there is the passage 200 on the left and right thereof, the two right seats correspond to the aircraft projection device 1 disposed inside the seat 100 on the right passage side, and the two left seats correspond to the aircraft projection device 1 disposed inside the seat 100 on the left passage side.

With this configuration, it is possible to display the image P corresponding to the seat 100 that does not face the passage 200.

Further, in this case, it is suitable to clearly indicate the seat 100 to which the drawing contents correspond. For example, it is possible to change the projection position, change the color, or illustrate the seat number by the seat 100 to give a clear indication.

Further, in a case where a plurality of seats 100 is disposed and each of the seat numbers is, for example, "A02," "B02," "C02," and "D02," when any one seat 100 becomes the seat-leaving state, the plurality of seat numbers including the seat where a passenger has left may displayed as the image P. For example, when "B02" becomes the seat-leaving state, "A02" and "B02" may be displayed, or all of "A02," "B02," "C02," and "D02" may be displayed.

As described above, by displaying the plurality of seat numbers, the passenger 300 who has left can recognize at least the row of the seats to be returned, and thus, can return to his/her correct seat 100.

Although the example related to the projection of the image P has been described above, various display aspects or projection timing is considered as an example of the display of the image P as follows.

For example, when a passenger is boarding, the projection start command may be sent to the aircraft projection device 1 of each seat 100 according to, for example, an operation of a crew member, and the image P of the seat number may be displayed. Further, by reading seat number date recorded in a boarding ticket, the image P of the route to the seat 100 may be displayed as a guide. By sensing an approach of a person, the display for a guide may be performed when the person approaches.

The image P of the request contents to a cabin attendant may be displayed according to an operation of the passenger 300. For example, the passenger 300 who wants to make a request for a drink or a blanket performs a predetermined operation using an operation device provided in the seat 100 to cause the desired request contents to be displayed.

Further, a display of contents that the passenger 300 wants to tell his/her situation, for example, a display indicating that the passenger does not want to be spoken because the passenger is sleeping, or a display indicating that the passenger appeals for his/her physical problems may be performed. It is possible to display a guide that indicates a direction to a toilet when leaving the seat, or to display a guide that indicates a direction of an evacuation route in an emergency.

Figure 5:
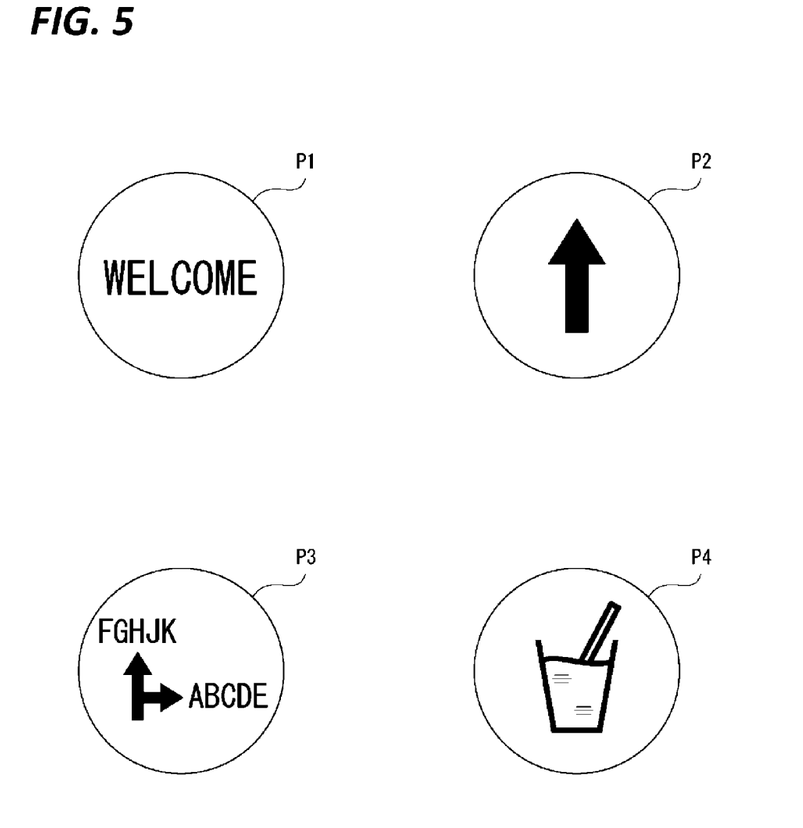
FIG. 5 is a view illustrating examples of drawing contents of the image.

In the following, examples of display contents of various images P will be illustrated (see FIG. 5). Examples of such display contents include, for example, a welcome image P1 when boarding, direction display images P2 and P3 for guiding a seat, and an image P4 indicating request contents. In addition to this, various display contents for promoting improvement on convenience for the passenger 300 are considered as the image P. Further, each of these images P may be displayed in a different color, or displayed in a blinking manner.

As in each of the examples above, the image P may have various display aspects. However, particularly in the present embodiment, the projector 5 is disposed inside the seat 100, and a projection hole 105 through which the projection light from the projector 5 passes is formed in the seat 100.

Therefore, a dedicated member for arranging the projector 5 is not necessary, and the projector 5 does not hinder the passenger 300 who is seated on or away from the seat 100, or the passage of the passenger 300 or a crew member who walks on the passage 200. Further, it may promote effective utilization of the arrangement space of the projector 5 and the improvement on convenience for the passenger 300 and the crew member.

Further, since the projection hole 105 is positioned below the seat surface 101*a* of the seat 100, the passenger 300 and the crew member do not feel dazzle by the projected light. Therefore, it is possible to promote the improvement on convenience without causing the passenger 300 and the crew member to feel inconvenience.

In particular, when the interior of the cabin is set to the night lighting mode, the image P does not hinder a passenger who is sleeping, and even in a situation where the passenger is asleep and calm, the passenger 300 is guided or makes a request without speaking. Therefore, it is possible to promote the improvement on convenience without causing troubles to other passengers 300.

For example, an illuminance sensor that detects the illuminance of the interior (cabin) is used as the sensor 3. When it is detected that the illuminance of the interior is below a certain illuminance by the illuminance sensor, the controller 2 may determine the occurrence of the projection start trigger based on the detection information of the illuminance sensor to project the image P. When it is detected that the illuminance of the interior is equal to or higher than a certain illuminance by the illuminance sensor, the controller 2 may determine the occurrence of the projection end trigger based on the detection information of the illuminance sensor to end the projection of the image P.

Therefore, since the projection start or the projection end of the image is performed based on the information of the illuminance of the interior detected by the illuminance sensor, for example, it is possible to perform the display of the useful contents for the passenger 300 only when necessary, for example, when the interior of the cabin is set to the night lighting mode.

Further, by receiving a signal with respect to illuminance (brightness) by the communication unit 6 instead of the illuminance sensor, the controller 2 may determine the projection start trigger or the projection end trigger based on the received signal, and perform the projection start or end of the image P.

In the above, although the example in which the projection hole 105 is positioned below the seat surface 101*a* of the seat 100 has been described, the forming position of the projection hole 105 may be other positions of the seat 100, and may be above the seat surface 101*a*.

Further, the projection hole 105 may be formed in a portion other than the seat 100. Particularly, when the use of the aircraft projection device 1 at night is not considered, for example, it is possible to dispose the aircraft projection device 1 on the back of the ceiling of the cabin and display the image P on the passage 200.

Further, as described above, by performing the display that is a guide for the passenger 300 such as a seat number or a direction indication as the image P, the passenger 300 recognizes the destination by visually recognizing the image P. Therefore, it is possible to make the movement of the passenger 300 smooth. For example, in addition to make the passenger 300 definitely reach their destination when boarding or going to and returning from the toilet, by correctly displaying, for example, the evacuation route in an emergency at appropriate timing, unnecessary chaos may be suppressed.

In particular, when the image P is a figure, a mark, or the like, it is also suitable for communication when the language does not match between the passenger 300 and the crew member.

As described above, the aircraft projection device 1 is provided with the projector 5 that displays the image P by projecting the image P on the floor surface of the passage 200 in the interior of the aircraft; and the controller 2 that controls the projector 5 to display the set image P.

Therefore, it is possible for the passenger 300 or the crew member to recognize the intention of the passenger 300 or an offer matter to the passenger 300 by visually recognizing the image P displayed on the floor surface of the passage 200, and thus the improvement on convenience for the passenger 300 may be promoted.

Further, the controller 2 performs the projection start control by the projector 5 according to the determination of the projection start trigger based on the detection information of the sensor 3, and performs the projection end control by the projector 5 according to the determination of the projection end trigger based on the detection information of the sensor 3.

Therefore, since the projection start control and the projection end control are performed based on the detection information of the sensor 3, it is possible to perform the display of the image P at an appropriate timing in accordance with the situation.

Further, the seating sensor configured to detect presence or absence of seating of the passenger 300 with respect to the seat 100 is provided as the sensor 3, and the controller 2 performs the determination of the projection start trigger or the determination of the projection end trigger based on the detection information of the seating sensor.

Therefore, since the projection start or the projection end of the image P is performed based on the information on the presence or absence of the seating with respect to the passenger 300 detected by the seating sensor, it is possible to perform the display of the useful contents for the passenger 300 only when necessary.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. An aircraft projection device comprising:
   a projector that displays an image by projecting the image onto a floor surface of a passage in an interior of an aircraft;
   an illuminance sensor configured to detect illuminance of the interior of the aircraft; and
   a controller configured to control the projector to display the image on the floor surface of the passage in the interior of the aircraft,
   wherein the controller controls the projector to perform a projection end control when the illuminance of the interior of the aircraft detected by the illuminance sensor is equal to or more than a predetermined value, and to perform a projection start control when the illuminance of the interior of the aircraft detected by the illuminance sensor is less than the predetermined value.

2. The aircraft projection device according to claim 1, wherein the projector displays a seat number as the image.

3. The aircraft projection device according to claim 2, wherein the projector is disposed inside a seat, and
   the seat has a projection hole through which projection light from the projector passes.

4. The aircraft projection device according to claim 3, wherein the projection hole is positioned below a seat surface of the seat.

5. The aircraft projection device according to claim 1, wherein the projector is disposed inside a seat, and the seat has a projection hole through which projection light from the projector passes.

6. The aircraft projection device according to claim 1, wherein the image is a welcome image when boarding.

7. The aircraft projection device according to claim 1, wherein the image is direction display images for guiding a seat.

8. The aircraft projection device according to claim 1, wherein the image is an image indicating request contents of a passenger.

9. An aircraft projection device comprising:
   a projector that displays an image by projecting the image onto a floor surface of a passage in an interior of an aircraft;
   a seating sensor configured to detect whether a passenger is seated on a seat; and
   a controller configured to control the projector to display the image on the floor surface of the passage in the interior of the aircraft,
   wherein the controller controls the projector to perform a projection start control when the seating sensor detects that the passenger has left from the seat, and to perform a projection end control when the seating sensor detects that the passenger has been seated on the seat, and
   the controller controls the projector to perform the projection end control when there is a first seat that is not reserved by the passenger and the seating sensor detects that the passenger has left from the first seat.

10. The aircraft projection device according to claim 9, wherein the projector displays a seat number as the image.

11. The aircraft projection device according to claim 9, wherein the projector is disposed inside the seat, and
   the seat has a projection hole through which projection light from the projector passes.

12. The aircraft projection device according to claim 9, wherein the projector and the controller are disposed in a second seat that faces the passage,
   a third seat that does not face the passage includes only the seating sensor, and
   the controller controls the projector to perform the projection start control when the seating sensor of the third seat detects that the passenger has left from the third seat, and to perform the projection end control when the seating sensor of the third seat detects that the passenger has been seated on the third seat.

* * * * *